(12) United States Patent
Copeland

(10) Patent No.: US 7,963,065 B1
(45) Date of Patent: Jun. 21, 2011

(54) FISHING STRIKE INDICATOR

(76) Inventor: James Alexander Copeland, Penn Hills, PA (US)

( * ) Notice: Subject to any disclaimer, the term of this patent is extended or adjusted under 35 U.S.C. 154(b) by 276 days.

(21) Appl. No.: 12/319,166

(22) Filed: Jan. 2, 2009

Related U.S. Application Data

(60) Provisional application No. 61/009,849, filed on Jan. 2, 2008.

(51) Int. Cl.
*A01K 97/12* (2006.01)

(52) U.S. Cl. .................... 43/17; 43/16

(58) Field of Classification Search ............ 43/17, 16, 43/25; *A01K 97/12*
See application file for complete search history.

(56) References Cited

U.S. PATENT DOCUMENTS

| | | | | |
|---|---|---|---|---|
| 2,529,320 | A * | 11/1950 | Vibber | 73/862.471 |
| 2,587,190 | A * | 2/1952 | Merriweather | 43/17 |
| 3,484,978 | A * | 12/1969 | Nakashima | 43/17 |
| 4,125,957 | A * | 11/1978 | Cunningham | 43/17 |
| 4,565,024 | A * | 1/1986 | Maerz | 43/17 |
| 4,573,281 | A * | 3/1986 | Moisan | 43/17 |
| 5,884,429 | A * | 3/1999 | Cube | 43/17 |
| 6,125,573 | A * | 10/2000 | Wilczynski | 43/25 |
| 7,478,498 | B1 * | 1/2009 | Barnhart | 43/17 |
| 2007/0068062 | A1 * | 3/2007 | Zeglen | 43/17 |

* cited by examiner

*Primary Examiner* — Kimberly S Smith
*Assistant Examiner* — Marisa Conlon

(57) ABSTRACT

A fishing strike indicator for providing a visual indication showing that a fish has taken a lure or bait includes an elongate body portion, a clamp for attachment to a fishing pole, a sliding connection joining the clamp to the elongate body portion, a line engaging feature formed as a portion of or attached to the elongate body portion, the line engaging feature engageable with a portion of a fishing line below the fishing pole, whereby tension in the portion of the fishing line below the pole causes the elongate body portion to move upwards thus providing the visual indication.

13 Claims, 4 Drawing Sheets

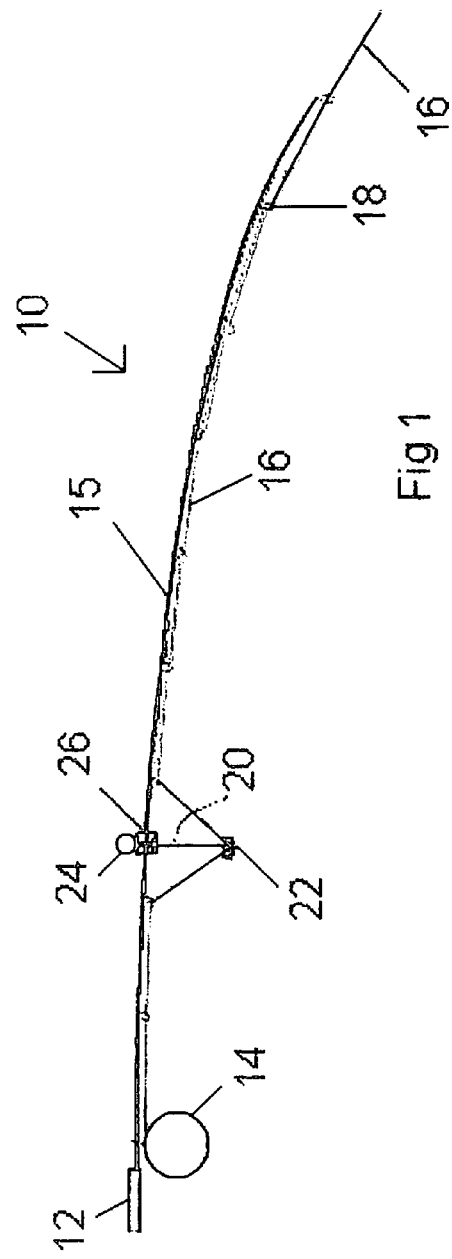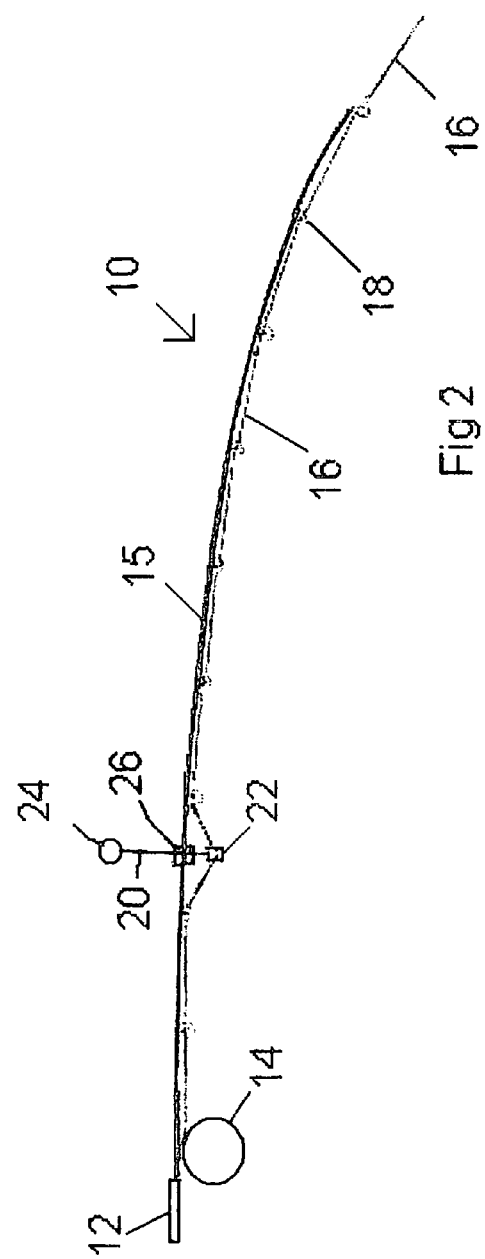

FISHING STRIKE INDICATOR

CROSS REFERENCE TO RELATED APPLICATIONS

This application claims the benefit of the provisional patent application entitled "Fishing Bobber" filed Jan. 2, 2008 and having Ser. No. 61/009,849.

FIELD OF THE INVENTION

The present invention relates, in general, to fishing strike indicators and, more particularly, relates to fishing strike indicators attachable to a fishing pole, or comprised as a portion of the fishing pole.

BACKGROUND OF THE INVENTION

Fishermen have found it desirable to provide some kind of strike indicator that shows when a fish has struck the baited hook or lure. Many of these are cast into the water body with the baited hook or lure, and they float. These provide a visual indication if there is a tug on a portion of the fishing line depending from the lure. These require the fisherman to be attentive to the floating bobber.

Another type of strike indicator is attached to the fishing line underneath the fishing pole at a point between grommets on the fishing pole. These strike indicators are attached to the fishing line after the cast has been made. They indicate tension in the fishing line. In the absence of tension, they hang some distance below the fishing pole, but when the line becomes taught, they are pulled up toward the underside of the pole.

Many strike indicators presently available have electronic or electrical features, which indicate tension by lights or audible alarms. Strike indicators presently in the art have many clever features, but there is still a need for a strike indicator that is simple and easy to use, and which provides a highly noticeable indication that a fish is on the line, and does not require batteries.

SUMMARY OF THE INVENTION

In one aspect, the present invention is a fishing strike indicator for providing a visual indication showing that a fish has taken a lure or bait, the strike indicator including an elongate body portion, a clamp for attachment to a fishing pole, a sliding connection joining the clamp to the elongate body portion, a line engaging feature formed as a portion of or attached to the elongate body portion, the line engaging feature engageable with a portion of a fishing line below the fishing pole, whereby tension in the portion of the fishing line below the pole causes the elongate body portion to move upwards thus providing the visual indication.

In another aspect, the present invention is a fishing pole including an elongate rod portion, a strike indicator comprising an elongate body portion, a sliding connection for joining the elongate body portion of the strike indicator to the elongate rod portion of the fishing pole, whereby the elongate body portion of the strike indicator is free to move vertically relative to the elongate rod portion of the fishing pole, a line engaging feature attached to the elongate body portion of the strike indicator, the line engaging feature engageable with a portion of a fishing line below the fishing pole, whereby tension in the portion of the fishing line below the pole causes the elongate body portion to move upwards, thus providing a visual indication of the presence of a fish.

BRIEF DESCRIPTION OF THE DRAWINGS

FIG. 1 is a schematic illustration of a fishing pole with the present invention attached thereto;

FIG. 2 is a schematic illustration of a fishing pole with the present invention in an elevated position, which indicates tension in the fishing line;

IDENTIFYING NUMERALS EMPLOYED IN THE DRAWINGS

Figure 3:
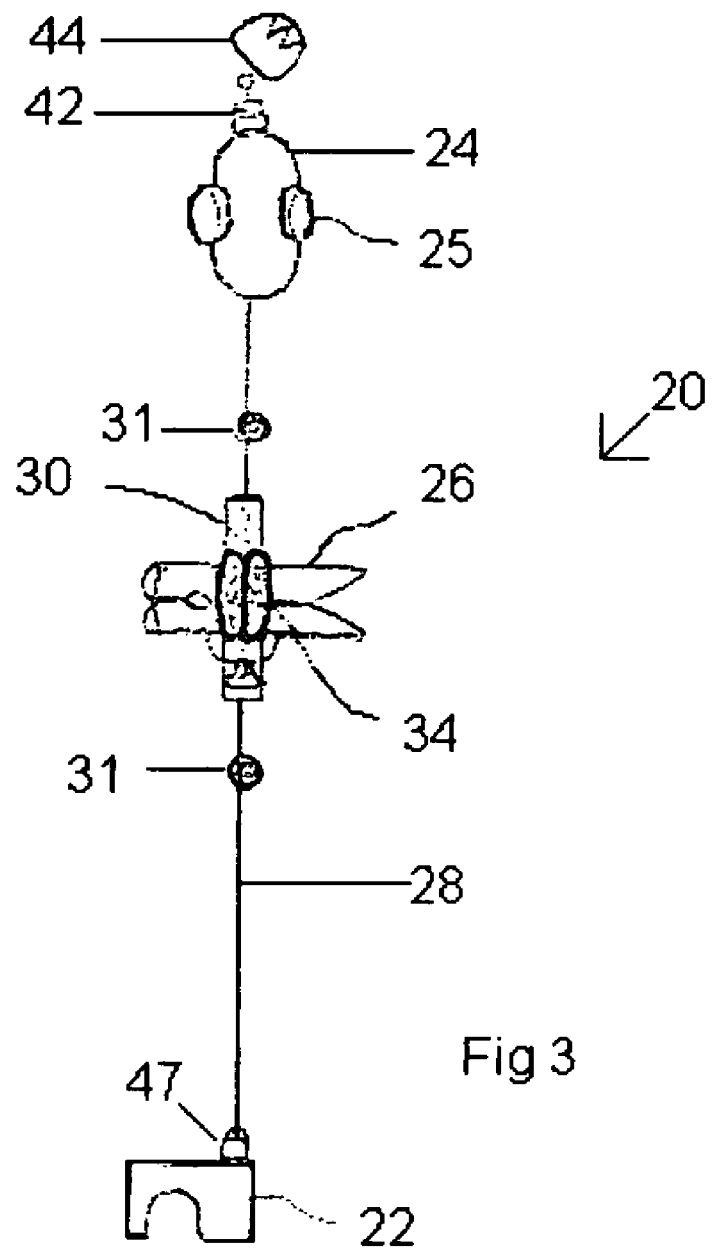
FIG. 3 is a schematic illustration of an embodiment of the strike indicator after assembly.

10 Fishing Pole
12 Handle
14 Reel
15 Rod portion of fishing pole
16 Fishing line
18 Grommets on pole
20 Strike indicator
22 Line engaging portion
24 Visual indicator
25 Wiggle eyes
26 Clamp
28 Elongate body portion
30 Sliding connection
31 Beads
32 Shrinkable tubing
34 Elastomeric grommet with circumferential groove
36 Cable tie
38 D-ring
40 Magnetic clasp
42 Magnetic clasp
44 Bell
45 Jump ring
47 Ear ring back piece
50 Fishing pole with strike indicator included
55 Rod portion of fishing pole
56 Sliding connection
60 Strike indicator portion of fishing pole 50

BRIEF DESCRIPTION OF THE PRESENTLY PREFERRED AND VARIOUS ALTERNATIVE EMBODIMENTS OF THE INVENTION

FIGS. 1 and 2 illustrate the present invention mounted for use on a fishing pole 10 having a handle 12 and reel 14. Fishing line 16 passes through grommets 18 disposed along pole 10. A strike indicator 20 according to the present invention is attached to rod portion 15 of pole 10, preferably at a location midway between grommets 18. After the cast, the fisherman pulls fishing line 16 downward to engage the line engaging feature 22 of strike indicator 20.

FIG. 1 illustrates the invention when there is no fish on the line, and tension in line 16 is low. FIG. 2 illustrates the invention when a fish is on the line, increasing tension in line 16. Visual indicator 24 provides the fisherman with an indication that a fish is on the line by moving upwards relative to fishing pole 10. Visual indicator 24 may comprise wiggle eyes 25.

FIG. 3 illustrates the assembled strike indicator 20. The strike indicator 20 includes an elongate body portion 28 that, preferably, comprises a stiff wire. A stainless steel wire about 0.037" in diameter (0.094 cm) and a length of about 5.5" (14 cm) may be employed. Strike indicator 20 includes a sliding connection 30 that may comprise a tube with an inside diameter sufficient to accommodate the elongate body portion 28 (the stiff wire). The sliding connection 30 may be secured in a circumferential groove in the elastomeric grommet 34 by a cable tie 36 (best seen in FIG. 4. Beads 31 may be placed as shown on elongate body portion 28.

In the presently preferred design, the elastomeric grommet 34 encloses a clamp 26 which, preferably, is a miniature clothes pin. (Many of the components of strike indicator 20 may be purchased in a craft store.) Shrinkable tubing 32 may be applied to one or both jaws of clamp 26 to provide enhanced friction. Clamp 26 is for attachment to fishing pole 10.

Figure 4:
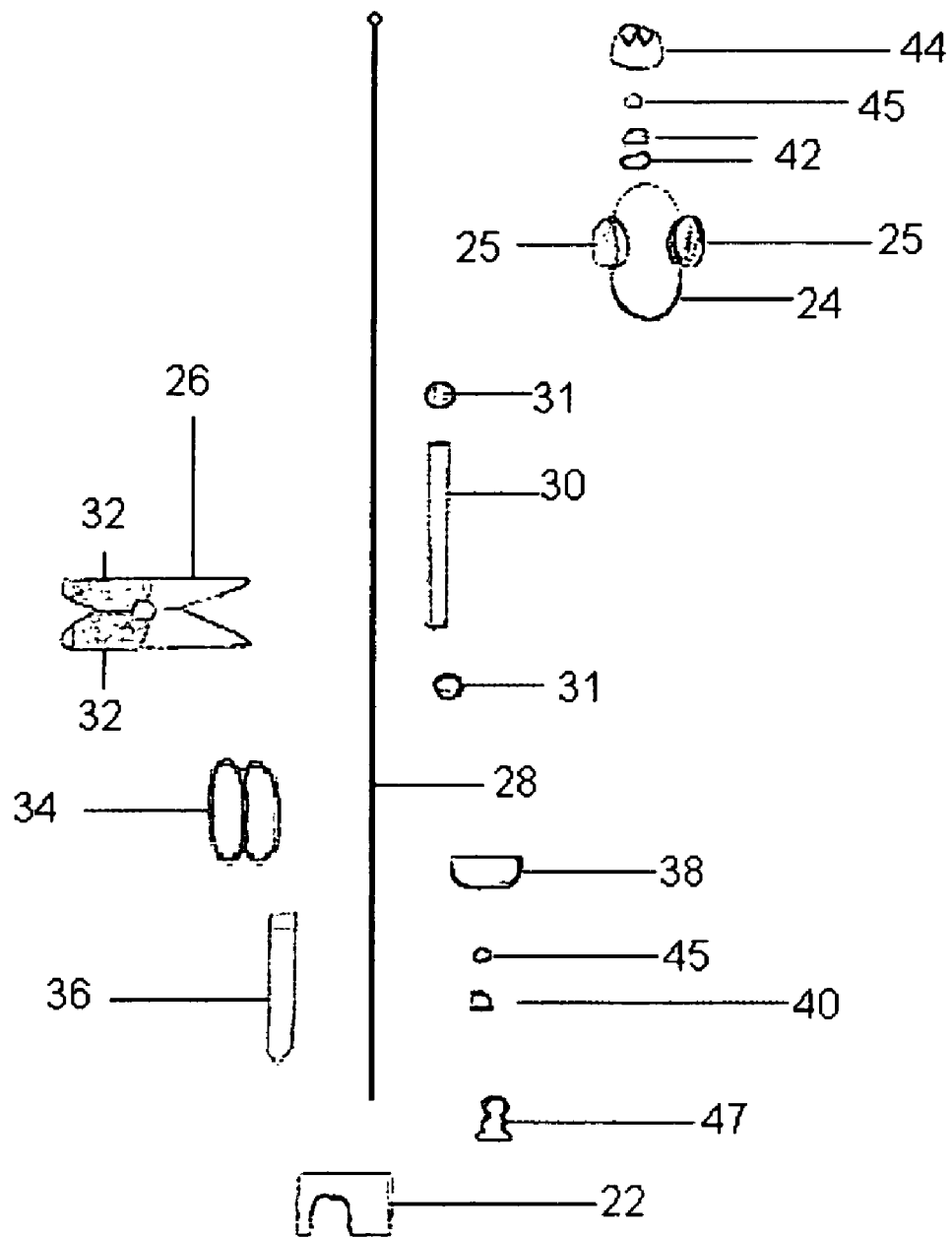
FIG. 4 is a schematic illustration of the unassembled components of the embodiment illustrated in FIG. 3.
Figure 5:
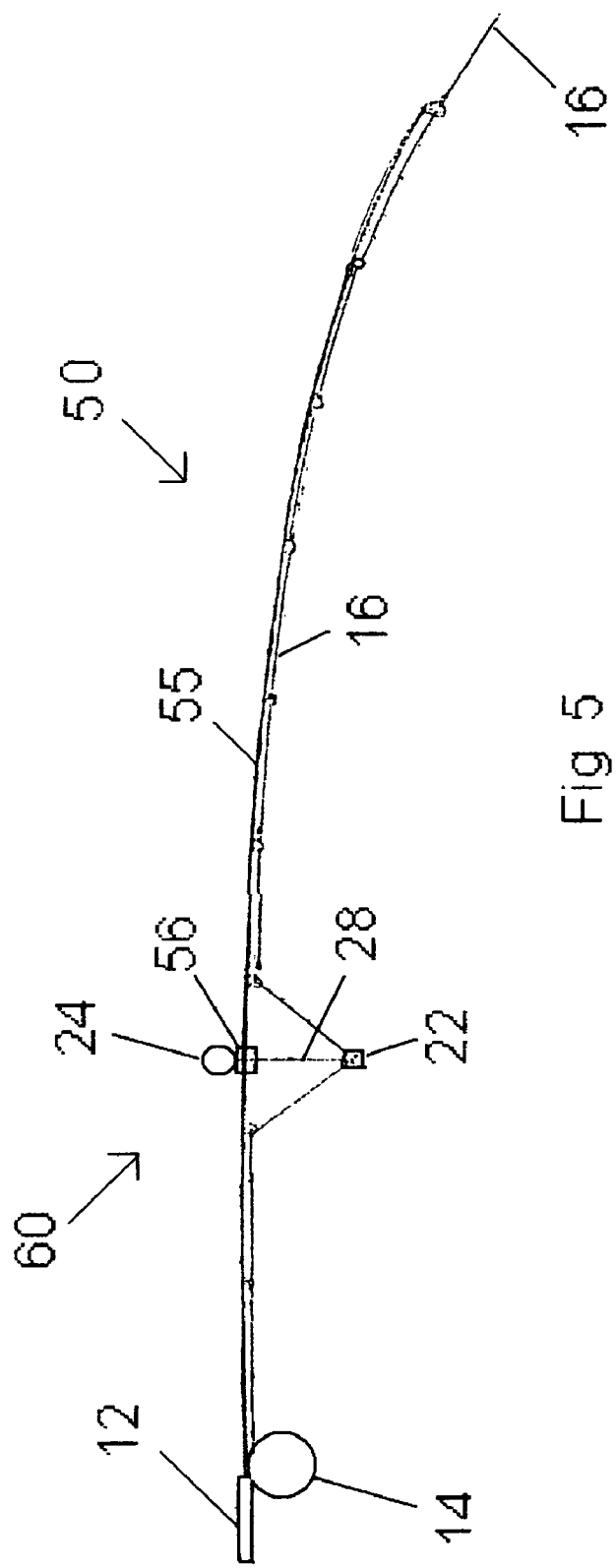
FIG. 5 is a schematic illustration of a fishing pole with the present invention formed as a portion thereof.

FIG. 4 shows the unassembled components of strike indicator 20 in greater detail. This figure also illustrates the optional wiggle eyes 25 on visual indicator 24. The visual indicator 24 may be fluorescent to facilitate fishing at night. FIG. 4 also illustrates bell 44 attached by jump ring 45 to magnetic clasp 42 at the upper end of visual indicator 24. A D-ring 38 may pass through elastomeric grommet 34. D-ring 38 may have a magnetic clasp 40 and provide an alternative placement for bell 44. One or more extra weights (not shown) may also be kept on the D-ring 38 or, alternatively, attached at the top of visual indicator 24. Extra weight may be applied to counter the effect of current in the water body that may cause some tension in fishing line 16. This would cause the moveable portions of strike indicator 20 to rise to the position illustrated in FIG. 2, even when no fish is present.

FIGS. 3 and 4 also illustrate a cable clip 22 that is employed as a line engaging feature. Preferably, line engaging feature 22 is attached at the bottom end of elongate body portion 28 (the stiff wire). It is oriented, as shown, with its opening downward.

When the fishing pole 10 with attached strike indicator 20 is used to cast the baited hook into the water, the strike indicator 20 may be rotated around the fishing pole so it is horizontal, and does not interfere with the fishing line 16. It is then rotated to the vertical orientation shown, and the line 16 is engaged to the line engaging portion 22.

FIG. 6 illustrates an alternative embodiment of the present invention. A fishing pole 50 comprising a handle 12, reel 14 and elongate rod portion 55 and carrying fishing line 16 includes a strike indicator portion 60 attached to rod portion 55 by sliding connection 56. Sliding connection 56 permits the elongate body portion 28 of strike indicator portion 60 to move upwards when there is tension in line 16.

Upward movement of strike indicator portion 60 elevates visual indicator 24, thus alerting the fisherman to the presence of a fish. A person skilled in the art will recognize that there are many modifications in the design which fall within the scope of the appended claims.

I claim:

1. A fishing strike indicator for use with a fishing pole, wherein the fishing pole comprises an elongate rod, a reel, eyelets, and a fishing line running lengthwise and below the elongate rod, through the eyelets; said strike indicator providing visual indication that a fish has taken a lure or bait; said strike indicator comprising:

an elongate body portion running substantially perpendicular to the elongate rod, wherein a portion of the elongate body portion is below the elongate rod and a portion of the elongate body portion is above the elongate rod;

a visual indicator disposed on an upper portion of said elongate body portion wherein said visual indicator moves upwards when said elongate body portion moves upwards;

a clamp for attachment to the fishing pole;

a sliding connection attached to said clamp, wherein the elongate body portion slides through the sliding connection perpendicular to the elongate rod;

a line engaging feature formed as a portion of or attached to said elongate body portion, said line engaging feature engageable with a portion of said fishing line below said elongate rod;

at least one weight attached to said elongate body portion;

wherein, in the disengaged position, the elongate body portion is weighted downwardly, such that the line engaging feature is lowered beneath the elongate rod so as to bend the fishing line away from the elongate rod;

wherein, upon the strike of a fish, the resulting increased tension of the fishing line forces the fishing line upwards towards the elongate rod portion, causing an upward movement of the line engaging feature and elongate body portion, such that a portion of the elongate body portion moves upwardly, through the sliding connection, so as to be positioned above the elongate rod;

wherein said upward movement of the elongate body portion causes the attached visual indicator to move upwardly therewith so as to provide visual indication of the strike.

2. A fishing strike indicator according to claim 1 wherein said elongate body portion comprises a wire.

3. A fishing strike indicator according to claim 1 further comprising an audible indicator attached to said elongate body portion.

4. A fishing strike indicator according to claim 3 wherein said audible indicator comprises a bell.

5. A fishing strike indicator according to claim 1 wherein a magnetic clasp holds said at least one weight.

6. A fishing strike indicator according to claim 1 wherein said sliding connection comprises a tube.

7. A fishing strike indicator according to claim 6 wherein said tube is disposed in a circumferential groove in an elastomeric grommet.

8. A fishing strike indicator according to claim 7 wherein said tube is assembled to said grommet by means of a cable tie.

9. A fishing strike indicator according to claim 1 wherein said line engaging feature comprises cable clip.

10. A fishing strike indicator according to claim 9 wherein said cable clip is attached to said elongate body portion by an ear ring back piece.

11. A fishing strike indicator according to claim 1 wherein said clamp comprises at least one jaw.

12. A fishing strike indicator according to claim 1 wherein shrinkable tubing covers at least a portion of said at least one jaw of said clamp.

13. A fishing strike indicator according to claim 1 wherein said visual indicator comprises three-dimensional eyes.

* * * * *